United States Patent
Naito et al.

(10) Patent No.: US 9,717,963 B2
(45) Date of Patent: Aug. 1, 2017

(54) GOLF CLUB SHAFT

(71) Applicant: DUNLOP SPORTS CO. LTD., Kobe-shi, Hyogo (JP)

(72) Inventors: Yasuo Naito, Kobe (JP); Takehiko Hyodo, Kobe (JP); Kazuyoshi Shiga, Kobe (JP); Hiroshi Hasegawa, Kobe (JP)

(73) Assignee: DUNLOP SPORTS CO. LTD., Kobe-Shi, Hyogo (JP)

( * ) Notice: Subject to any disclaimer, the term of this patent is extended or adjusted under 35 U.S.C. 154(b) by 0 days.

(21) Appl. No.: 14/902,097

(22) PCT Filed: Jun. 6, 2014

(86) PCT No.: PCT/JP2014/065096
§ 371 (c)(1),
(2) Date: Dec. 30, 2015

(87) PCT Pub. No.: WO2015/001909
PCT Pub. Date: Jan. 8, 2015

(65) Prior Publication Data
US 2016/0367872 A1  Dec. 22, 2016

(30) Foreign Application Priority Data
Jul. 2, 2013 (JP) .................................. 2013-138961

(51) Int. Cl.
*A63B 53/10* (2015.01)
*C08J 5/24* (2006.01)
(Continued)

(52) U.S. Cl.
CPC ............ *A63B 53/10* (2013.01); *B29C 70/202* (2013.01); *C08J 5/24* (2013.01); *C08L 63/00* (2013.01);
(Continued)

(58) Field of Classification Search
CPC ..................... C08G 59/00–59/38; A63B 53/10
See application file for complete search history.

(56) References Cited

U.S. PATENT DOCUMENTS

| 2011/0009528 A1* | 1/2011 | Tomioka | .............. | C08G 59/184 |
| | | | | 523/428 |
| 2013/0217805 A1* | 8/2013 | Hayashi | ..................... | C08J 5/24 |
| | | | | 523/427 |
| 2015/0290900 A1* | 10/2015 | Tsunashima | .......... | A63B 49/10 |
| | | | | 473/316 |

FOREIGN PATENT DOCUMENTS

| JP | WO 2008143044 A1 * | 11/2008 | ............. | B32B 27/38 |
| JP | 2009-74009 A | 4/2009 | | |

(Continued)

OTHER PUBLICATIONS

English translation of Japanese Office Action, dated Nov. 22, 2016, for Japanese Application No. 2013-138961.

*Primary Examiner* — Vu A Nguyen
(74) *Attorney, Agent, or Firm* — Birch, Stewart, Kolasch & Birch, LLP

(57) ABSTRACT

An object of the present invention is to provide a golf club shaft having excellent strength. The present invention provides a golf club shaft made of a fiber-reinforced epoxy resin material comprising a cured product of an epoxy resin composition and a reinforcing fiber, wherein the epoxy resin composition comprises at least one selected from the group consisting of a bisphenol A type epoxy resin, a bisphenol F type epoxy resin and a novolac type epoxy resin, and a tetraglycidyl type epoxy resin as an epoxy resin component, and the cured product of the epoxy resin composition has a swelling ratio in a range from 20 mass % to 44 mass % in methyl ethyl ketone.

20 Claims, 3 Drawing Sheets

(a)

(b)

(51) Int. Cl.
*C08L 63/00* (2006.01)
*B29C 70/20* (2006.01)

(52) U.S. Cl.
CPC ..... *A63B 2209/023* (2013.01); *C08J 2363/00* (2013.01); *C08J 2429/14* (2013.01); *C08J 2463/00* (2013.01); *C08L 2205/025* (2013.01); *C08L 2205/03* (2013.01)

(56) References Cited

FOREIGN PATENT DOCUMENTS

| | | |
|---|---|---|
| JP | 2011-231187 A | 11/2011 |
| JP | 2012-197414 A | 10/2012 |
| JP | 2013-1767 A | 1/2013 |
| WO | 2009/107697 A1 | 9/2009 |

\* cited by examiner

GOLF CLUB SHAFT

FIELD OF THE INVENTION

The present invention relates to a golf club shaft, and more specifically, relates to improvement in the strength of a golf club shaft.

DESCRIPTION OF THE RELATED ART

Conventionally, a tubular body made of a fiber-reinforced epoxy resin material is used for a golf club shaft. As a resin composition used for the fiber-reinforced epoxy resin, for example, Patent literature 1 discloses a resin composition comprising a glycidylamine type epoxy resin (A), a bisphenol F type epoxy resin (B) and an acid anhydride curing agent (C), wherein a mass ratio of the glycidylamine type epoxy resin (A) and the bisphenol F type epoxy resin (B) ranges from 90:10 to 30:70, and a content of the acid anhydride curing agent (C) is such a value that a theoretical blending ratio of an acid anhydride contained in the acid anhydride curing agent (C) to epoxy groups contained in the glycidylamine type epoxy resin (A) and the bisphenol F type epoxy resin (B) is 0.8 equivalent or more and 1.3 equivalents or less.

Patent literature 2 discloses an epoxy resin composition comprising (A) 15 to 50 mass % of an isocyanate modified epoxy resin, (B) 20 to 60 mass % of a bisphenol A type epoxy resin and/or a bisphenol F type epoxy resin, and (C) 15 to 30 mass % of a multifunctional epoxy resin, wherein (D) a polyamine based epoxy resin curing agent has been incorporated in such an amount that the number of the active hydrogen equivalent thereof is 1.15 times to 1.50 times as great as the number of the epoxy equivalent of the entire epoxy resins.

CITATION LIST

Patent Literature

Patent literature 1: Japanese Patent Publication No. 2013-1767A
Patent literature 2: Japanese Patent Publication No. 2011-231187 A

SUMMARY OF THE INVENTION

Problems to be Solved

Because of the requirement of the higher performance and higher quality of a golf club, the strength of the tubular body made of the fiber-reinforced composite material using the above-described epoxy resin composition has become insufficient. Particularly, in recent years, a part where the thickness of the shaft is thin is formed in order to control the location of the center of gravity, whipping extent and the like of the shaft, thus higher strength is required for the golf club shaft.

Conventionally, the resin component used for the fiber-reinforced composite material generally has a high crosslinking density in light of heat resistance, thus the resin component shows insufficient toughness. For this reason, the strength of the interface between the reinforcing fiber and the resin component in the fiber-reinforced composite material is insufficient. However, in case of increasing toughness by merely decreasing the crosslinking density of the resin component, even if the strength of the interface between the reinforcing fiber and the resin component improves, the resin component shows decreased modulus of elasticity, and the fiber-reinforced composite material shows lowered compressive strength.

Various forces such as bending and twisting are applied on the golf club shaft when conducting hitting. For this reason, even if the strength of the interface between the reinforcing fiber and the resin component is improved, if the fiber-reinforced composite material has low compressive strength, the strength of the golf club shaft is not improved. The present invention has been made in view of the above-described circumstances, and an object of the present invention is to provide a golf club shaft having excellent strength.

Solutions for Solving Problems

The present invention provides a golf club shaft made of a fiber-reinforced epoxy resin material comprising a cured product of an epoxy resin composition and a reinforcing fiber, wherein the epoxy resin composition comprises, as an epoxy resin component, at least one selected from the group consisting of a bisphenol A type epoxy resin, a bisphenol F type epoxy resin and a novolac type epoxy resin; and a tetraglycidyl type epoxy resin;

and the cured product of the epoxy resin composition has a swelling ratio in a range from 20 mass % to 44 mass % in methyl ethyl ketone.

As an epoxy resin component, if the tetraglycidyl type epoxy resin is blended into an epoxy resin composition comprising the bisphenol A type epoxy resin, the bisphenol F type epoxy resin or the novolac type epoxy resin, the toughness of the resin component is increased, and at the same time, the strength and the elastic modulus of the resin component can be increased. In addition, the swelling ratio in methyl ethyl ketone is an index of the crosslinking density of the epoxy resin composition. The cured product of the epoxy resin composition having a swelling ratio in methyl ethyl ketone within the above range has an appropriate elongation and gives excellent adhesion to the reinforcing fiber. As a result, the effect of the reinforcement with the reinforcing fiber is increased due to the improved strength of the interface between the reinforcing fiber and the matrix resin, and the strength and the elastic modulus of the resin component are increased, thus the mechanical strength of the obtained golf club shaft is further improved.

The tetraglycidyl type epoxy resin is preferably a glycidylamine type epoxy resin, more preferably at least one selected from the group consisting of tetraglycidyl diaminodiphenylmethane, tetraglycidyl diaminodiphenyl ether and tetraglycidyl diaminodiphenylsulfone. A content of the tetraglycidyl type epoxy resin in the epoxy resin component preferably ranges from 1 mass % to 25 mass %. The epoxy resin composition preferably further comprises a polyvinyl formal in an amount ranging from 2 parts by mass to 12 parts by mass with respect to 100 parts by mass of the epoxy resin component. The epoxy resin composition preferably comprises dicyandiamide as a curing agent and a urea derivative as a curing accelerator. The epoxy resin component preferably has an epoxy equivalent in a range from 200 g/eq to 400 g/eq.

The reinforcing fiber preferably includes a carbon fiber. The reinforcing fiber preferably has a tensile modulus in a range from 10 tf/mm$^2$ to 70 tf/mm$^2$.

Effects of Invention

The golf club shaft of the present invention has excellent strength.

DESCRIPTION OF THE PREFERRED EMBODIMENT

Figure 1:
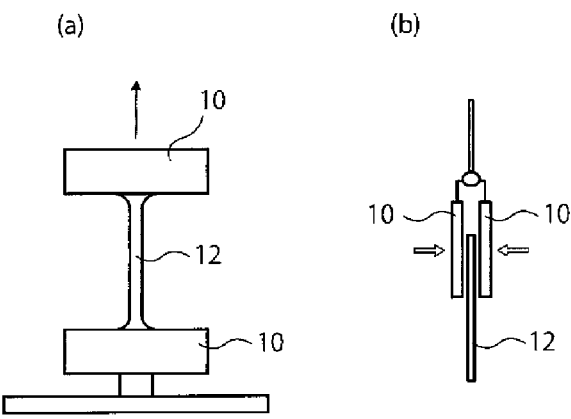
FIG. 1 illustrates an embodiment of a tensile test.

The present invention provides a golf club shaft made of a fiber-reinforced epoxy resin material comprising a cured product of an epoxy resin composition and a reinforcing fiber, wherein the epoxy resin composition comprises, as an epoxy resin component, at least one selected from the group consisting of a bisphenol A type epoxy resin, a bisphenol F type epoxy resin and a novolac type epoxy resin; and a tetraglycidyl type epoxy resin; and the cured product of the epoxy resin composition has a swelling ratio in a range from 20 mass % to 44 mass % in methyl ethyl ketone.

The epoxy resin composition used in the present invention will be explained. The epoxy resin composition comprises, as an epoxy resin component, at least one selected from the group consisting of a bisphenol A type epoxy resin, a bisphenol F type epoxy resin and a novolac type epoxy resin; and a tetraglycidyl type epoxy resin. As an epoxy resin component, in addition to the bisphenol A type epoxy resin, the bisphenol F type epoxy resin or the novolac type epoxy resin, if the tetraglycidyl type epoxy resin is blended, the toughness of the resin component can be improved while maintaining the tensile strength and the tensile modulus of the resin component. As a result, the strength of the interface between the reinforcing fiber and the resin component can be increased, and thus the strength of the obtained golf club shaft can be increased.

The tetraglycidyl type epoxy resin has four glycidyl groups in its molecule. The tetraglycidyl type epoxy resin is preferably a glycidylamine type epoxy resin represented by the formula (1).

[Chemical formula 1]

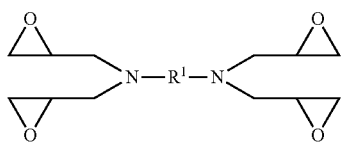

(1)

[In the formula (1), $R^1$ represents a divalent group.]

The divalent group is not particularly limited. The divalent group may be a hydrocarbon group, or a group having a sulfonyl group or ether group in its main chain. The divalent group preferably has an arylene group. Examples of the divalent group include phenylene group, tolylene group, xylyene group, biphenyl diyl group, diphenylmethane diyl group, diphenyl ether diyl group, diphenylsulfone diyl group, naphthylene group, anthracene diyl group, fluorine diyl group, cyclohexane diyl group, and decalin diyl group.

The compound represented by the formula (1) is preferably compounds represented by the formulae (2) to (4), N,N,N',N'-tetraglycidyl-m-xylylenediamine, 1,3-bis(N,N-diglycidylaminomethyl)cyclohexane, 1,3-bis(N,N-diglycidylaminomethyl)phenylene, and the like.

[Chemical formula 2]

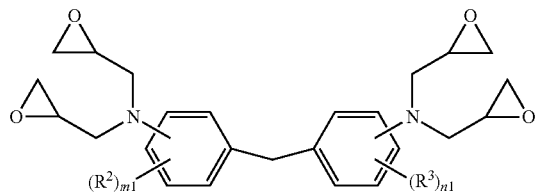

(2)

[In the formula (2), $R^2$ and $R^3$ independently represent an alkyl group having 1 to 4 carbon atoms, m1 represents an integer of 0 to 4, and n1 represents an integer of 0 to 4.]

[Chemical formula 3]

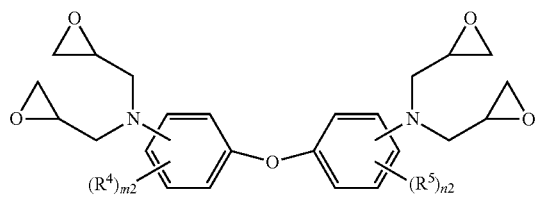

(3)

[In the formula (3), $R^4$ and $R^5$ independently represent an alkyl group having 1 to 4 carbon atoms, m2 represents an integer of 0 to 4, and n2 represents an integer of 0 to 4.]

[Chemical formula 4]

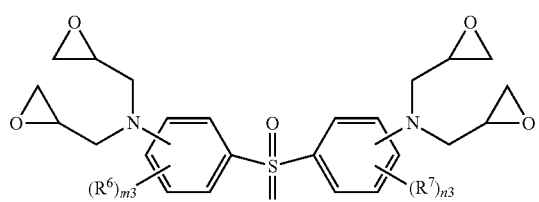

(4)

[In the formula (4), $R^6$ and $R^7$ independently represent an alkyl group having 1 to 4 carbon atoms, m3 represents an integer of 0 to 4, and n3 represents an integer of 0 to 4.]

Examples of the compound represented by the formula (2) include tetraglycidyl-4,4'-diaminodiphenylmethane, tetraglycidyl-4,4'-diamino-5-methyldiphenylmethane, tetraglycidyl-4,4'-diamino-2'-methyldiphenylmethane, tetraglycidyl-4,4'-diamino-2,2'-dimethyldiphenylmethane, tetraglycidyl-4,4'-diamino-2,3'-dimethyldiphenylmethane, tetraglycidyl-4,4'-diamino-3,3'-dimethyldiphenylmethane, tetraglycidyl-4,4'-diamino-3,3',5,5'-tetraethyldiphenylmethane, tetraglycidyl-4,4'-diamino-3,3',5,5'-tetrabromodiphenylmethane, tetraglycidyl-3,4'-diaminodiphenylmethane, tetraglycidyl-3,4'-diamino-5-methyldiphenylmethane, tetraglycidyl-3,4'-diamino-2'-methyldiphenylmethane, tetraglycidyl-3,4'-diamino-3'-methyldiphenylmethane, tetraglycidyl-3,4'-diamino-2,2'-dimethyldiphenylmethane, tetraglycidyl-3,4'-diamino-5,2'-dimethyldiphenylmethane, tetraglycidyl-3,4'-diamino-5,3'-dimethyldiphenylmethane, tetraglycidyl-3,3'-diaminodiphenylmethane, tetraglycidyl-3,3'-diamino-5-methyldiphenylmethane, and tetraglycidyl-3,3'-diamino-5,5'-dimethyldiphenylmethane.

Examples of the compound represented by the formula (3) include tetraglycidyl-4,4'-diaminodiphenyl ether, tetraglycidyl-4,4'-diamino-5-methyldiphenyl ether, tetraglycidyl-4,4'-diamino-2'-methyldiphenyl ether, tetraglycidyl-4,4'-diamino-2,2'-dimethyldiphenyl ether, tetraglycidyl-4,4'-diamino-2,3'-dimethyldiphenyl ether, tetraglycidyl-4,4'-diamino-3,3'-dimethyldiphenyl ether, tetraglycidyl-4,4'-diamino-3,3',5,5'-tetraethyldiphenyl ether, tetraglycidyl-4,4'-diamino-3,3',5,5'-tetrabromodiphenyl ether, tetraglycidyl-3,4'-diaminodiphenyl ether, tetraglycidyl-3,4'-diamino-5-methyldiphenyl ether, tetraglycidyl-3,4'-diamino-2'-methyldiphenyl ether, tetraglycidyl-3,4'-diamino-3'-methyldiphenyl ether, tetraglycidyl-3,4'-diamino-2,2'-dimethyldiphenyl ether, tetraglycidyl-3,4'-diamino-5,2'-dimethyldiphenyl ether, tetraglycidyl-3,4'-diamino-5,3'-dimethyldiphenyl ether, tetraglycidyl-3,3'-diaminodiphenyl ether, tetraglycidyl-3,3'-diamino-5-methyldiphenyl ether, and tetraglycidyl-3,3'-diamino-5,5'-dimethyldiphenyl ether.

Examples of the compound represented by the formula (4) include tetraglycidyl-4,4'-diaminodiphenylsulfone, tetraglycidyl-4,4'-diamino-5-methyldiphenylsulfone, tetraglycidyl-4,4'-diamino-2'-methyldiphenylsulfone, tetraglycidyl-4,4'-diamino-2,2'-dimethyldiphenylsulfone, tetraglycidyl-4,4'-diamino-2,3'-dimethyldiphenylsulfone, tetraglycidyl-4,4'-diamino-3,3'-dimethyldiphenylsulfone, tetraglycidyl-4,4'-diamino-3,3',5,5'-tetraethyldiphenylsulfone, tetraglycidyl-4,4'-diamino-3,3',5,5'-tetrabromodiphenylsulfone, tetraglycidyl-3,4'-diaminodiphenylsulfone, tetraglycidyl-3,4'-diamino-5-methyldiphenylsulfone, tetraglycidyl-3,4'-diamino-2'-methyldiphenylsulfone, tetraglycidyl-3,4'-diamino-3'-methyldiphenylsulfone, tetraglycidyl-3,4'-diamino-2,2'-dimethyldiphenylsulfone, tetraglycidyl-3,4'-diamino-5,2'-dimethyldiphenylsulfone, tetraglycidyl-3,4'-diamino-5,3'-dimethyldiphenylsulfone, tetraglycidyl-3,3'-diaminodiphenylsulfone, tetraglycidyl-3,3'-diamino-5-methyldiphenylsulfone, and tetraglycidyl-3,3'-diamino-5,5'-dimethyldiphenylsulfone.

The tetraglycidyl type epoxy resin may be used solely, or as a combination of two or more of them. The tetraglycidyl type epoxy resin is preferably tetraglycidyldiaminodiphenylmethane, tetraglycidyldiaminodiphenylether, or tetraglycidyldiaminodiphenylsulfone.

The epoxy equivalent (g/eq) of the tetraglycidyl type epoxy resin is preferably 105 or more, more preferably 110 or more, and even more preferably 115 or more, and is preferably 170 or less, more preferably 160 or less, and even more preferably 150 or less.

Examples of the tetraglycidyl type epoxy resin include jER (registered trademark) 604 (manufactured by Mitsubishi Chemical Corporation), SUMI EPDXY (registered trademark) ELM434 (manufactured by Sumitomo Chemical Co., Ltd.), and Araldite (registered trademark) MY720, MY721 (manufactured by Huntsman Advanced Materials, Inc.).

The content of the tetraglycidyl type epoxy resin in the entire epoxy resin components contained in the epoxy resin composition is preferably 1 mass % or more, more preferably 5 mass % or more, and even more preferably 9 mass % or more, and is preferably 25 mass % or less, more preferably 22 mass % or less, and even more preferably 19 mass % or less. If the content of the tetraglycidyl type epoxy resin is 1 mass % or more, the matrix resin of the fiber-reinforced epoxy resin material has better elastic modulus because the crosslinking density thereof is increased, and if the content of the tetraglycidyl type epoxy resin is 25 mass % or less, the matrix resin of the fiber-reinforced epoxy resin material has better elongation because the crosslinking density thereof does not become excessively high.

As the bisphenol A type epoxy resin, a bisphenol A type epoxy resin in a liquid state or a bisphenol A type epoxy resin in a solid state at normal temperature (25° C.) may be used. The bisphenol A type epoxy resin has two epoxy groups in its molecule.

The viscosity (25° C.) of the bisphenol A type epoxy resin in a liquid state at normal temperature is preferably 60 P (6 Pa·s) or more, more preferably 75 P (7.5 Pa·s) or more, and even more preferably 90 P (9 Pa·s) or more, and is preferably 300 P (30 Pa·s) or less, more preferably 250 P (25 Pa·s) or less, and even more preferably 200 P (20 Pa·s) or less. The viscosity of the epoxy resin can be measured with a viscoelasticity measuring apparatus (manufactured by Anton Paar Corporation, "MCR301", applied torque: 6 mN·m). The epoxy equivalent (g/eq) of the bisphenol A type epoxy resin in a liquid state at normal temperature is preferably 170 or more, more preferably 175 or more, and even more preferably 180 or more, and is 300 or less, more preferably 290 or less, and even more preferably 280 or less.

The epoxy equivalent (g/eq) of the bisphenol A type epoxy resin in a solid state at normal temperature is preferably 300 or more, more preferably 350 or more, and even more preferably 400 or more, and is preferably 20000 or less, more preferably 18000 or less, and even more preferably 16000 or less.

Examples of the bisphenol A type epoxy resin in a liquid state at normal temperature include jER (registered trademark) 827, jER 828, jER 828EL, jER 828)(A, jER 834 (all of them are manufactured by Mitsubishi Chemical Corporation); Epotohto (registered trademark) YD-115, Epotohto YD-115G, Epotohto YD-115CA, Epotohto YD-118T, Epotohto YD-127, Epotohto YD-128, Epotohto YD-128G, Epotohto YD-128S (all of them are manufactured by Tohto Kasei Co., Ltd.); and EPICLON (registered trademark) 840, EPICLON 840-S, EPICLON 850, EPICLON 850-S (all of them are manufactured by DIC Corporation).

Examples of the bisphenol A type epoxy resin in a solid state at normal temperature include jER 1001, jER 1002, jER 1003, jER 1003F, jER 1004, jER 1004FS, jER 1004F, jER 1004AF, jER 1055, jER 1005F, jER 1006FS, jER 1007, jER 1007FS, jER 1008, jER 1009 (all of them are manufactured by Mitsubishi Chemical Corporation); Epotohto YD-011, Epotohto YD-012, Epotohto YD-013, Epotohto YD-014, Epotohto YD-017, Epotohto YD-019, Epotohto YD-020N, Epotohto YD-020H (all of them are manufactured by Tohto Kasei Co., Ltd.); and EPICLON 1050, EPICLON 3050, EPICLON 4050, EPICLON 7050 (all of them are manufactured by DIC Corporation). The bisphenol A type epoxy resin may be used solely, or as a combination of two or more of them.

As the bisphenol F type epoxy resin, a bisphenol F type epoxy resin in a liquid state or a bisphenol F type epoxy resin in a solid state at normal temperature (25° C.) may be used. The bisphenol F type epoxy resin has two epoxy groups in its molecule.

The viscosity (25° C.) of the bisphenol F type epoxy resin in a liquid state at normal temperature is preferably 9 P (0.9 Pa·s) or more, more preferably 12 P (1.2 Pa·s) or more, and even more preferably 15 P (1.5 Pa·s) or more, and is preferably 300 P (30 Pa·s) or less, more preferably 250 P (25 Pa·s) or less, and even more preferably 200 P (20 Pa·s) or less. The epoxy equivalent (g/eq) of the bisphenol F type epoxy resin in a liquid state at normal temperature is preferably 150 or more, more preferably 155 or more, and even more preferably 160 or more, and is preferably 300 or less, more preferably 290 or less, and even more preferably 280 or less.

The epoxy equivalent (g/eq) of the bisphenol F type epoxy resin in a solid state at normal temperature is preferably 300 or more, more preferably 350 or more, and even more preferably 400 or more, and is preferably 20000 or less, more preferably 18000 or less, and even more preferably 16000 or less.

Examples of the bisphenol F type epoxy resin in a liquid state at normal temperature include jER 806, jER 807 (both of them are manufactured by Mitsubishi Chemical Corporation); and EPICLON 830, EPICLON 830-S, EPICLON 835 (all of them are manufactured by DIC Corporation). Examples of the bisphenol F type epoxy resin in a solid state at normal temperature include jER 4005P, jER 4007P, jER 4010P (all of them are manufactured by Mitsubishi Chemical Corporation). The bisphenol F type epoxy resin may be used solely, or as a combination of two or more of them.

If the bisphenol A type epoxy resin or the bisphenol F type epoxy resin in a solid state at normal temperature (25° C.) is used, the weight average molecular weight of the bisphenol type epoxy resin is preferably 650 or more, more preferably 700 or more, and even more preferably 750 or more, and is preferably 10000 or less, more preferably 9500 or less, and even more preferably 9000 or less. If the weight average molecular weight falls within the above range, a crosslinked structure can be effectively formed. The weight average molecular weight may be measured by gel permeation chromatography (GPC), using polystyrene as a standard substance.

As the bisphenol A type epoxy resin and the bisphenol F type epoxy resin, the epoxy resin in a liquid state at normal temperature (25° C.) and the epoxy resin in a solid state at normal temperature (25° C.) are preferably used in combination. Examples of the embodiment include an embodiment where the bisphenol A type epoxy resin in a liquid state at normal temperature and the bisphenol A type epoxy resin in a solid state at normal temperature are used; an embodiment where the bisphenol F type epoxy resin in a solid state at normal temperature and the bisphenol F type epoxy resin in a liquid state at normal temperature are used; an embodiment where the bisphenol A type epoxy resin in a liquid state at normal temperature and the bisphenol F type epoxy resin in a solid state at normal temperature are used; and an embodiment where the bisphenol A type epoxy resin in a solid state at normal temperature and the bisphenol F type epoxy resin in a liquid state at normal temperature are used. Among them, the embodiments using the bisphenol F type epoxy resin in a solid state at normal temperature are preferred.

The epoxy resin composition preferably comprises both the bisphenol A type epoxy resin and the bisphenol F type epoxy resin. In this case, the mass ratio (bisphenol A type epoxy resin/bisphenol F type epoxy resin) of the bisphenol A type epoxy resin to the bisphenol F type epoxy resin in the epoxy resin composition is preferably 0.3 or more, more preferably 0.4 or more, and even more preferably 0.5 or more, and is preferably 3.0 or less, more preferably 2.5 or less, and even more preferably 2.0 or less. If the mass ratio falls within the above range, tackiness of the prepreg can be enhanced while maintaining the strength and toughness of the cured product of the epoxy resin composition.

The novolac type epoxy resin is a multifunctional epoxy resin having more than two (preferably three or more) epoxy groups in its molecule. If the novolac type epoxy resin is comprised, the crosslinking density of the cured product of the epoxy resin composition can be controlled. It is thought that the strength of the interface between the reinforcing fiber and the epoxy resin is improved by controlling the crosslinking density to make the elongation of the cured product of the epoxy resin composition fall within an appropriate range. The novolac type epoxy resin is not particularly limited, and examples thereof include a phenolic novolac type epoxy resin, and an o-cresol novolac type epoxy resin.

The epoxy equivalent (g/eq) of the novolac type epoxy resin is preferably 50 or more, more preferably 75 or more, and even more preferably 100 or more, and is preferably 500 or less, more preferably 400 or less, and even more 300 or less. If the epoxy equivalent of the novolac type epoxy resin falls within the above range, a crosslinked structure can be effectively formed.

Examples of the commercially available phenolic novolac type epoxy resin include jER (registered trademark) 152, jER 154 (both of them are manufactured by Mitsubishi Chemical Corporation); EPICLON (registered trademark) N-740, EPICLON N-770, EPICLON N-775 (all of them are manufactured by DIC Corporation); PY 307, EPN 1179, EPN 1180 (all of them are manufactured by Huntsman Advanced Materials, Inc.); YDPN 638, YDPN 638P (both of them are manufactured by Tohto Kasei Co., Ltd.); DEN 431, DEN 438, DEN 439 (all of them are manufactured by the Dow Chemical Company); EPR 600 (manufactured by Bakelite AG); and EPPN-201 (manufactured by NIPPON KAYAKU Co., Ltd.). The novolac type epoxy resin may be used solely, or as a combination of two or more of them.

The content of the novolac type epoxy resin in the entire epoxy resin components contained in the epoxy resin composition is preferably 2 mass % or more, more preferably 5 mass % or more, and even more preferably 7 mass % or more, and is preferably 19 mass % or less, more preferably 15 mass % or less, and even more preferably 10 mass % or less. If the content of the novolac type epoxy resin is 2 mass % or more, the cured product of the resin composition has further increased strength because the crosslinking density thereof is increased, and if the content of the novolac type epoxy resin is 19 mass % or less, the elongation of the cured product of the resin composition is maintained, and the strength of the fiber-reinforced epoxy resin material is further increased because the strength of the interface between the reinforcing fiber and the resin component is increased.

The total content of the tetraglycidyl type epoxy resin and the novolac type epoxy resin in the entire epoxy resin components contained in the epoxy resin composition is preferably 4 mass % or more, more preferably 7 mass % or more, and even more preferably 10 mass % or more, and is preferably 25 mass % or less, more preferably 23 mass % or less, and even more preferably 19 mass % or less. If the total content of the tetraglycidyl type epoxy resin and the novolac type epoxy resin is 4 mass % or more, the cured product of the resin composition has further increased strength because the crosslinking density thereof is increased, and if the total content of the tetraglycidyl type epoxy resin and the novolac type epoxy resin is 25 mass % or less, the elongation of the cured product of the resin composition is maintained, and the strength of the fiber-reinforced epoxy resin material is further increased because the strength of the interface between the reinforcing fiber and the resin component is increased.

Examples of the embodiment of the epoxy resin composition include an embodiment where the tetraglycidyl type epoxy resin and the bisphenol A type epoxy resin are comprised; an embodiment where the tetraglycidyl type epoxy resin and the bisphenol F type epoxy resin are comprised; an embodiment where the tetraglycidyl type epoxy resin and the novolac type epoxy resin are comprised; an embodiment where the tetraglycidyl type epoxy resin, the bisphenol A type epoxy resin, and the bisphenol F type epoxy resin are comprised; an embodiment where the tetraglycidyl type epoxy resin, the bisphenol A type epoxy resin, and the novolac type epoxy resin are comprised; an embodiment where the tetraglycidyl type epoxy resin, the bisphenol F type epoxy resin, and the novolac type epoxy resin are comprised; and an embodiment where the tetraglycidyl type epoxy resin, the bisphenol A type epoxy resin, the bisphenol F type epoxy resin, and the novolac type epoxy resin are comprised.

The epoxy resin component of the epoxy resin composition may consist of the tetraglycidyl type epoxy resin and the bisphenol A type epoxy resin, the bisphenol F type epoxy resin and/or the novolac type epoxy resin, or preferably further comprises an epoxy resin having two epoxy groups in its molecule, i.e. a difunctional epoxy resin, other than the above epoxy resins. Specific examples of the difunctional epoxy resin include a bisphenol type epoxy resin such as a hydrogenated product of a bisphenol A type epoxy resin, a hydrogenated product of a bisphenol F type epoxy resin, a bisphenol S type epoxy resin, a tetrabromo bisphenol A type epoxy resin, and a bisphenol AD type epoxy resin. The bisphenol type epoxy resin may be used solely, or as a mixture of two or more of them.

The content of the difunctional epoxy resin in the entire epoxy resin components contained in the epoxy resin composition is preferably 75 mass % or more, more preferably 78 mass % or more, and even more preferably 81 mass % or more, and is preferably 98 mass % or less, more preferably 96 mass % or less, and even more preferably 93 mass % or less.

The epoxy equivalent (g/eq) of the entire epoxy resin components contained in the epoxy resin composition is preferably 200 or more, more preferably 250 or more, and is preferably 400 or less, more preferably 350 or less. If the epoxy equivalent of the entire epoxy resin components is less than 200, the epoxy resin components are liquid at normal temperature and thus it may be difficult to produce or mold a prepreg. On the other hand, if the epoxy equivalent of the entire epoxy resin components is more than 400, the epoxy resin components are in a solid state at normal temperature and thus molding may be difficult.

The epoxy resin composition used in the present invention preferably comprises a curing agent. Examples of the curing agent include dicyandiamide; an aromatic amine having an active hydrogen such as 4,4'-diaminodiphenylmethane, 4,4'-diaminodiphenylsulfone, 3,3'-diaminodiphenylsulfone, m-phenylenediamine, and m-xylylenediamine; an aliphatic amine having an active hydrogen such as diethylenetriamine, triethylenetetramine, isophoronediamine, bis(aminomethyl) norbornane, bis(4-aminocyclohexyl) methane, and an dimer acid ester of polyethyleneimine; a modified amine obtained by reacting a compound such as an epoxy compound, acrylonitrile, phenol and formaldehyde and thiourea, with the above-described amine having the active hydrogen; a tertiary amine having no active hydrogen such as dimethylaniline, triethylenediamine, dimethylbenzylamine, and 2,4,6-tris(dimethylaminomethyl) phenol; imidazoles such as 2-methylimidazole and 2-ethyl-4-methylimidazole; a polyamide resin; a carboxylic anhydride such as hexahydrophthalic anhydride, tetrahydrophthalic anhydride, methylhexahydrophthalic anhydride, and methylnadic anhydride; a polycarboxylic acid hydrazide such as adipic acid hydrazide and naphthalene dicarboxylic acid hydrazide; a polyphenol compound such as a novolac resin; a polymercaptan such as a ester of thioglycolic acid and a polyol; and a Lewis acid complex such as a boron trifluoride ethylamine complex. The curing agent may be used solely, or as a combination of two or more of them. Among them, dicyandiamide is preferably used as the curing agent.

The amount of the dicyandiamide is preferably 13 g or more, more preferably 15 g or more, and even more preferably 17 g or more, and is preferably 40 g or less, more preferably 38 g or less, and even more preferably 35 g or less, with respect to 1 mole of the epoxy group of the epoxy resin component. If the amount of the dicyandiamide is 13 g or more, the curing reaction further proceeds and thus the strength is further increased, and if the amount of the dicyandiamide is 40 g or less, the elongation of the cured product of the resin composition is maintained, and the strength of the interface between the reinforcing fiber and the cured product of the resin component is increased. Accordingly, the strength of the fiber-reinforced epoxy resin material is further increased.

In combination with the curing agent, an appropriate curing accelerator can be used for enhancing the curing activity. As the curing accelerator, a urea derivative in which at least one of the hydrogens bonded to urea is replaced with a hydrocarbon group is preferred. The hydrocarbon group may be further replaced with, for example, a halogen atom, a nitro group, an alkoxy group, or the like. Examples of the urea derivative include a derivative of a mono-urea compound such as 3-phenyl-1,1-dimethylurea, 3-(parachlorophenyl)-1,1-dimethylurea, 3-(3,4-dichlorophenyl)-1,1-dimethylurea, 3-(orthomethylpheny)-1,1-dimethylurea, 3-(paramethylphenyl)-1,1-dimethylurea, 3-(methoxyphenyl)-1,1-dimethylurea, and 3-(nitrophenyl)-1,1-dimethylurea; and a derivative of a bis-urea compound such as N,N-phenylene-bis(N',N'-dimethylurea) and N,N-(4-methyl-1,3-phenylene)-bis(N',N'-dimethylurea). The curing accelerator may be used solely, or as a combination of two or more of them.

Examples of the preferable combination include combinations of dicyandiamide with, as a curing accelerator, a urea derivative such as 3-phenyl-1,1-dimethylurea, 3-(3,4-dichlorophenyl)-1,1-dimethylurea (DCMU), 3-(3-chloro-4-methylphenyl)-1,1-dimethylurea, and 2,4-bis(3,3-dimethylureido) toluene. Among them, the combination of dicyandiamide with 3-(3,4-dichlorophenyl)-1,1-dimethylurea (DCMU) as a curing accelerator is more preferred.

In the present invention, preferably used is dicyandiamide (DICY) as a curing agent and a urea derivative as a curing accelerator. In this case, the content ratio (DICY/urea derivative) of dicyandiamide (DICY) to the urea derivative is preferably 1.0 or more, more preferably 1.2 or more, and even more preferably 1.5 or more, and is preferably 3.0 or less, more preferably 2.8 or less, and even more preferably 2.5 or less, in a mass ratio. In addition, the mass ratio (DICY/urea derivative) is most preferably 2. If the mass ratio of DICY/urea derivative falls within the above range, the curing rate is high and the cured product has better properties.

The epoxy resin composition of the present invention may further comprise other components such as an oligomer, a high-molecular-weight compound, and organic or inorganic particles.

Examples of the oligomer that can be blended in the epoxy resin composition used in the present invention include a polyester polyurethane having a polyester backbone and a polyurethane backbone, a urethane (meth)acrylate having a polyester backbone and a polyurethane backbone and further having a (meth)acrylate group at a terminal of the molecular chain, and an indene based oligomer.

As the high-molecular-weight compound that can be blended in the epoxy resin composition used in the present invention, a thermoplastic resin is suitably used. If the thermoplastic resin is blended, controllability of the viscosity of the resin, controllability of the handling of the prepreg sheet, and an effect of adhesion improvement are enhanced. Thus, blending of the thermoplastic resin is preferred.

Examples of the thermoplastic resin include a polyvinyl acetal resin such as polyvinyl formal and polyvinyl butyral; a polyvinyl alcohol; a thermoplastic resin having amide bonds such as polyamide and polyimide; and a thermoplastic resin having a sulfonyl group such as polysulfone. Each of polyamide, polyimide and polysulfone may have ether linkage or a functional group such as a carbonyl group in its main chain. Polyamide may have a substituent on the nitrogen atom of the amide group. The epoxy resin composition used in the present invention preferably comprises polyvinyl formal as a thermoplastic resin. If polyvinyl formal is comprised, the toughness and elongation of the cured product are further increased.

The content of the thermoplastic resin is preferably 2 parts by mass or more, more preferably 3 parts by mass or more, and even more preferably 4 parts by mass or more, and is preferably 12 parts by mass or less, more preferably 8 parts by mass or less, with respect to 100 parts by mass of the epoxy resin component. If the content of the thermoplastic resin is 2 parts by mass or more, the epoxy resin composition has better elongation and tackiness can be provided thereto. On the other hand, if the content of the thermoplastic resin exceeds 12 parts by mass, the epoxy resin composition may be solidified at normal temperature. Thus, the impregnation to the reinforcing fiber may be lowered and a void may be caused during the production of a prepreg.

As the organic particles that can be blended in the epoxy resin composition used in the present invention, rubber particles and thermoplastic resin particles can be used. These particles provide effects of improving the toughness of the resin and improving the impact resistance of the fiber-reinforced composite material. Furthermore, as the rubber particles, crosslinked rubber particles, and core-shell rubber particles having a different type polymer graft-polymerized on the surface of crosslinked rubber particles are preferably used.

As the commercially available crosslinked rubber particles, XER-91 (manufactured by JSR Corporation) composed of a crosslinked product of a carboxyl-modified butadiene-acrylonitrile copolymer, CX-MN series (manufactured by Nippon Shokubai Co., Ltd.) composed of acrylic rubber fine particles, YR-500 series (manufactured by Tohto Kasei Co., Ltd.), and the like can be used. As the commercially available core-shell rubber particles, PARALOID EXL-2655 (manufactured by Kureha Corporation) composed of a butadiene-alkyl methacrylate-styrene copolymer, Staphyloid AC-3355 and TR-2122 (manufactured by Takeda Pharmaceutical Company Limited) composed of an acrylic acid ester-methacrylic acid ester copolymer, PARALOID EXL-2611 and EXL-3387 (registered trademarks, trade names, manufactured by Rohm and Haas Company) composed of a butyl acrylate-methyl methacrylate copolymer, and the like can be used.

In addition, as the thermoplastic resin particles, particles of polyamide or polyimide are preferably used. As the commercially available polyamide particles, trade name SP-500 manufactured by Toray Industries Inc., Orgasol (registered trademark) manufactured by Elf ATOCHEM, and the like can be used.

As the inorganic particles that can be blended in the epoxy resin composition, silica, alumina, smectite, synthetic mica, and the like can be blended. These inorganic particles are blended into the epoxy resin composition, mainly in order to control rheology, namely, to increase the viscosity and impart thixotropy.

In the present invention, the swelling ratio of the cured product of the epoxy resin composition in methyl ethyl ketone is 20 mass % or more, preferably 25 mass % or more, and is 44 mass % or less, preferably 38 mass % or less. The swelling ratio in methyl ethyl ketone is an index of the crosslinking degree of the cured product of the epoxy resin composition. If the swelling ratio is less than 20 mass %, the crosslinking density is so high that the elongation of the cured product of the epoxy resin composition is lowered, and if the swelling ratio exceeds 44 mass %, the crosslinking density is so low that the strength of the cured product of the epoxy resin composition is lowered.

The tensile strength (maximum tensile stress) of the cured product of the epoxy resin composition is preferably 85 MPa or more, more preferably 90 MPa or more, and even more preferably 95 MPa or more, and is preferably 500 MPa or less, more preferably 450 MPa or less, and even more preferably 400 MPa or less.

The elongation at break (tensile strain at break) of the cured product of the epoxy resin composition is preferably 12% or more, more preferably 13% or more, and even more preferably 14% or more, and is preferably 300% or less, more preferably 200% or less, and even more preferably 100% or less.

The tensile elastic modulus (initial modulus of elasticity) of the cured product of the epoxy resin composition is preferably 2900 MPa or more, more preferably 3100 MPa or more, and even more preferably 3300 MPa or more, and is preferably 10000 MPa or less, more preferably 8000 MPa or less, and even more preferably 6000 MPa or less. Measurement methods of the tensile strength, elongation and tensile modulus will be described later.

The resin component of the fiber-reinforced epoxy resin material preferably consists of the above epoxy resin composition, however, a commercially available epoxy resin composition may be used in combination as long as it does not impair the effect of the present invention. When the commercially available epoxy resin composition is used in combination, the content of the commercially available epoxy resin composition in the resin component of the fiber-reinforced epoxy resin material is preferably 95 mass % or less, more preferably 90 mass % or less, and even more preferably 80 mass % or less.

In the present invention, examples of the reinforcing fiber used in the fiber-reinforced epoxy resin material include a carbon fiber, a glass fiber, an aramid fiber, a boron fiber, an alumina fiber, and a silicon carbide fiber. In addition, two or more of these fibers can be mixed. Among them, the carbon fiber is preferably used.

Examples of the carbon fiber include an acrylic based carbon fiber, a pitch based carbon fiber, and a rayon based carbon fiber. Among them, the acrylic based carbon fiber having high tensile strength is preferred. As the form of the carbon fiber, a so-called twisted yarn which is a carbon fiber obtained by twisting and baking a precursor fiber, a so-called untwisted yarn which is a carbon fiber obtained by untwisting the twisted yarn, and a non-twisted yarn obtained by conducting thermal treatment on a precursor fiber without substantially twisting the precursor fiber, and the like can be used. The non-twisted yarn or the untwisted yarn is preferable in view of the balance between the moldability and the strength properties of the fiber-reinforced composite material, and the non-twisted yarn is more preferable in terms of handling such as adhesion between prepreg sheets. In addition, the carbon fiber in the present invention may also include a graphite fiber.

The tensile elastic modulus of the reinforcing fiber is preferably 10 tf/mm$^2$ (98 GPa) or more, more preferably 24 tf/mm$^2$ (235 GPa) or more, and is preferably 70 tf/mm$^2$ (686 GPa) or less, more preferably 50 tf/mm$^2$ (490 GPa) or less. The tensile elastic modulus is measured according to JIS R 7601 (1986) "testing methods for carbon fibers". When the tensile elastic modulus of the reinforcing fiber falls within the above range, a tubular body having high bending strength is obtained.

The content of the reinforcing fiber in the fiber-reinforced epoxy resin material of the present invention is preferably 35 mass % or more, more preferably 50 mass % or more, even more preferably 65 mass % or more, and particularly preferably 70 mass % or more, and is preferably 85 mass % or less, more preferably 84 mass % or less, even more preferably 80 mass % or less, and particularly preferably 75 mass % or less. If the content of the reinforcing fiber falls within the above range, a favorable fiber-reinforced epoxy resin material utilizing the high strength of the resin sufficiently is provided.

As the method for manufacturing the golf club shaft of the present invention, a conventionally known method may be employed. Examples of the method include a method of producing a prepreg by impregnating the reinforcing fiber such as a carbon fiber with the epoxy resin composition, cutting the prepreg into the shape of each material constituting the golf club shaft, laminating each material, and then pressuring the laminated product while heating.

The prepreg may be produced by a method such as a wet method in which the epoxy resin composition is dissolved in a solvent such as methyl ethyl ketone or methanol to decrease the viscosity thereof and the reinforcing fiber is impregnated; and a hot-melt method in which the epoxy resin composition is heated to decrease the viscosity thereof and the reinforcing fiber is impregnated. The wet method is a method in which the reinforcing fiber is immersed in a solution of the epoxy resin composition, then pulled out, and heated with an oven or the like to evaporate the solvent, thereby obtaining a prepreg. The hot-melt method includes a method in which the reinforcing fiber is directly impregnated with the epoxy resin composition having decreased viscosity by heating; and a method in which films are produced in advance by coating the epoxy resin composition on a releasing paper or the like, laminated on both sides or one side of the reinforcing fiber, and heated to make the reinforcing fiber impregnated with the epoxy resin composition, thereby obtaining a prepreg. The hot-melt method is preferred since the solvent substantially does not remain in the prepreg.

The method of applying pressure to a laminated product of prepregs while heating the laminated product includes a wrapping tape method and an inner-pressure molding method. The wrapping tape method is a method in which prepregs are wound around a core roller such as a mandrel to obtain a molded body. Specifically, the wrapping tape method is a method in which the prepregs are wound around the mandrel, a wrapping tape composed of a thermoplastic resin film is wound around the outside of the prepregs for fixing the prepregs and providing pressure to the prepregs, the resin is heated in an oven to be cured, and then, the core roller is removed to obtain a molded body. The surface of the molded body may be cut, and painting or the like may be conducted on the molded body.

The inner-pressure molding method is a method in which prepregs are wound around an inner-pressure provider, such as a tube made of a thermoplastic resin, to make a preform, then the preform is placed in a mold, and a high-pressure gas is introduced into the inner-pressure provider to apply pressure while the mold is heated, to conduct molding.

Examples of the form of the reinforcing fiber in the prepreg include a long fiber oriented in one direction, a bidirectional woven product, a multiaxial woven product, a nonwoven fabric, a mat, a knit, and a braid. Here, the long fiber means a single fiber or fiber bundle substantially continuous for 10 mm or more. A so-called unidirectional prepreg using long fibers oriented in one direction can highly utilize the strength in the fiber direction, because the fibers have the same direction and less bend. In addition, with regard to the unidirectional prepreg, when a plurality of prepregs are appropriately laminated such that the arrangement directions of the reinforcing fibers thereof are different from each other, and then molding is conducted, designing the elastic modulus and the strength of a molded product in each direction becomes easy.

The prepreg preferably has a sheet shape. When the prepreg has a sheet shape, the thickness thereof is preferably 0.01 mm or more, more preferably 0.03 mm or more, and is preferably 1.0 mm or less, more preferably 0.9 mm or less.

The number of laminated prepregs constituting the golf club shaft, the content of the reinforcing fiber, the thickness of each prepreg, and the like are preferably changed as appropriate according to desired properties. In particular, required rigidity and strength are preferably provided to the golf club shaft by appropriately arranging a bias prepreg whose reinforcing fibers are arranged so as to be tilted relative to the axis of the shaft, a straight prepreg whose reinforcing fibers are arranged parallel to the axis of the shaft, and a hoop prepreg whose reinforcing fibers are arranged perpendicular to the axis of the shaft.

Furthermore, the golf club shaft may also be obtained without using the above-described prepreg which is an intermediate base material. Specifically, a molded body may also be obtained by a filament winding molding method in which a roving of the reinforcing fiber is impregnated with the epoxy resin composition and wound around a core roller, then the resin is heated and cured. The surface of the molded body may be cut, and painting or the like may be conducted on the molded body.

The length of the golf club shaft is preferably 40 inch (101.6 cm) or more, more preferably 41 inch (104.1 cm) or more, and is preferably 49 inch (124.5 cm) or less, more preferably 48 inch (121.9 cm) or less. In addition, the weight of the tubular body is preferably 30 g or more, more preferably 35 g or more, and is preferably 80 g or less, more preferably 75 g or less. If the length and weight of the tubular body fall within the above range, the golf club using the golf club shaft composed of the tubular body has favorable usability.

The thickness of the golf club shaft is preferably 0.5 mm or more, more preferably 0.6 mm or more, and is preferably 4 mm or less, more preferably 3.5 mm or less. If the thickness of the shaft falls within the above range, whipping is well conducted. In addition, the center of gravity and the whipping location of the shaft can be controlled by adjusting the location of the low-thickness part of the shaft.

The golf club shaft of the present invention can be used for a golf club. The golf club comprises a golf club shaft, a golf club head provided on one end of the golf club shaft, and a grip provided on other end of the golf club shaft. Examples of the golf club head include a wood type, a utility type, and an iron type. The material constituting the golf club head is not particularly limited, and examples thereof include titanium, a titanium alloy, a carbon fiber-reinforced plastic, stainless steel, maraging steel, and soft iron.

EXAMPLES

Hereinafter, the present invention will be described in detail by way of examples. The present invention is not limited to the examples described below. Various changes and modifications can be made without departing from the spirit and scope of the present invention.

[Evaluation Method]
(1) Production of Test Pieces
[Production of Test Pieces for Resin Tensile Test and Test Pieces for Swelling Test in Methyl Ethyl Ketone]

Methyl ethyl ketone (MEK) solutions (MEK content: 30%) of epoxy resins were prepared by dissolving epoxy resin components in MEK so as to have each epoxy resin composition formulation shown in Table 1. The obtained MEK solutions of epoxy resins were dried and heated to melt, and a curing agent and a curing accelerator were added thereto, followed by stirring. The obtained epoxy resin compositions were poured into a 2 mm-thick casting mold and treated at 130° C. for 2 hours to be cured, respectively. Test pieces for tensile test were molded from the cured resin plate according to JIS K 7162 (1994) test piece 1 BA. In addition, test pieces having a square shape of 2 cm×2 cm were cut out, and used as test pieces for methyl ethyl ketone swelling test.

[Production of Test Pieces Having 90 Degree-Fiber Direction for Bending Test]

MEK solutions (MEK content: 30%) of epoxy resins were prepared by dissolving epoxy resin components in MEK so as to have each formulation shown in Table 1. A curing agent and a curing accelerator were added to the obtained MEK solutions of epoxy resins, followed by stirring, to prepare epoxy resin composition solutions. The epoxy resin composition solutions were applied to releasing papers and dried at 80° C. to 90° C. for three minutes to produce epoxy resin composition sheets. Carbon fiber sheets having a fiber mass per unit area of 100 g/m² were impregnated with the obtained epoxy resin composition sheets by a hot-melt method, to produce prepregs having a carbon fiber content of 70 mass %. The obtained prepregs were cut and twenty two pieces of the prepregs were laminated such that the fibers thereof were arranged in a fixed direction. The laminated product was sandwiched between 0.1 mm-thick releasing sheets, and pressed with a 2 mm-thick spacer under the conditions of 80° C.×30 minutes+130° C.×2 hours to cure the epoxy resins, thereby obtaining fiber-reinforced epoxy resin material sheets. The obtained fiber-reinforced epoxy resin material sheets were cut into a size of 100 mm length in the direction perpendicular to the fiber and 15 mm width in the fiber direction, to produce test pieces.

(2) Swelling Test in Methyl Ethyl Ketone

The above-obtained test pieces (2 cm square, thickness: 2 mm) for swelling test in methyl ethyl ketone was immersed into 100 mL of methyl ethyl ketone and kept at 40° C. for 48 hours. The mass of the test piece was measured before and after the immersion, and the swelling ratio in methyl ethyl ketone was calculated based on the following formula.

Swelling ratio=100×[mass of test piece after swelling test−mass of test piece before swelling test]/mass of test piece before swelling test (3) Tensile Test The tensile test was conducted at a tension rate of 1 mm/min with a Shimadzu autograph (manufactured by Shimadzu Corporation), according to JIS K 7161 (1994). FIG. 1 (a) schematically illustrates the tensile test method for a test piece 12 composed of a cured product of an epoxy resin composition. FIG. 1 (b) is a side view obtained by observing chucks 10 pinching the test piece 12 in FIG. 1 (a) from its side. It is noted that in FIG. 1 (b), recesses and projections for preventing slip are provided inside the chuck 10 but not shown. In FIG. 1 (a), the arrow direction is the direction for the tensile test.

(4) Bending Test for Test Pieces Having 90 Degree-Fiber Direction

Figure 2:
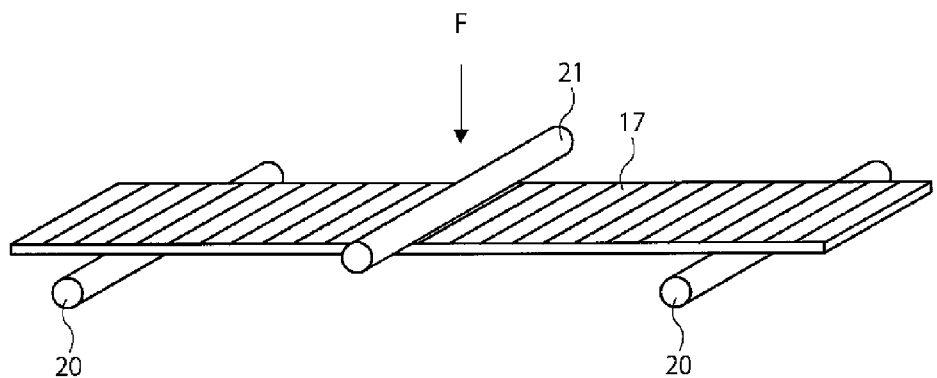
FIG. 2 illustrates an embodiment of a bending test for a test piece having a 90 degree-fiber direction.

The test was conducted at a pushing rate of 5 mm/min with a Shimadzu autograph (manufactured by Shimadzu Corporation), according to JIS K 7074 (1988). Specifically, as shown in FIG. 2, a fiber-reinforced epoxy resin material 17 was supported at two points from its bottom such that the distance between fulcrums 20, 20 (radius: 2.0 mm) was 72 mm. An indenter (radius: 5.0 mm) 21 was pushed with a load F at a center between the fulcrums from above the fiber-reinforced epoxy resin material 17, and the bending strength (maximum bending stress applied on the test piece) of the fiber-reinforced epoxy resin material 17 was measured. It is noted that the axis directions of the fulcrum 20 and the indenter 21 were arranged parallel to the fiber direction of the reinforcing fibers in the fiber-reinforced epoxy resin material 17.

(5) Three-Point Bending Test

Figure 3:
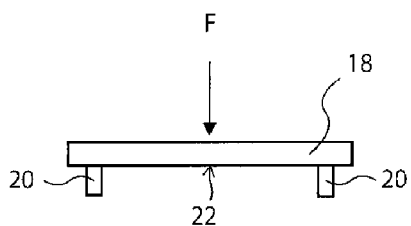
FIG. 3 illustrates an embodiment of a bending test.

As shown in FIG. 3, a tubular body 18 was supported at two points from its bottom such that the distance between fulcrums 20, 20 was 300 mm, a load F was applied at a midpoint 22 between the fulcrums from above the tubular body 18, and the load value (peak value) was measured when the tubular body was broken. It is noted that the midpoint 22 at which the load F was applied to the tubular body 18 was set to the center portion of the tubular body. The measurement was conducted under the following conditions.

Test apparatus: autograph manufactured by Shimadzu Corporation

Loading rate: 20 mm/min

[Production of Tubular Body Made of Fiber-Reinforced Epoxy Resin Material]

Methyl ethyl ketone (MEK) solutions (MEK content: 30%) of epoxy resins were prepared by dissolving epoxy resin components in MEK so as to have each formulation shown in Table 1. A curing agent and a curing accelerator were added to the obtained MEK solutions of epoxy resins, followed by stirring, to prepare epoxy resin composition solutions. The epoxy resin composition solutions were applied to releasing papers and dried at 80° C. to 90° C. for three minutes to produce epoxy resin composition sheets. Carbon fiber sheets having a fiber mass per unit area of 100 g/m² were impregnated with the obtained epoxy resin composition sheets by a hot-melt method, to produce prepregs having a carbon fiber content of 70 mass %.

Figure 4:
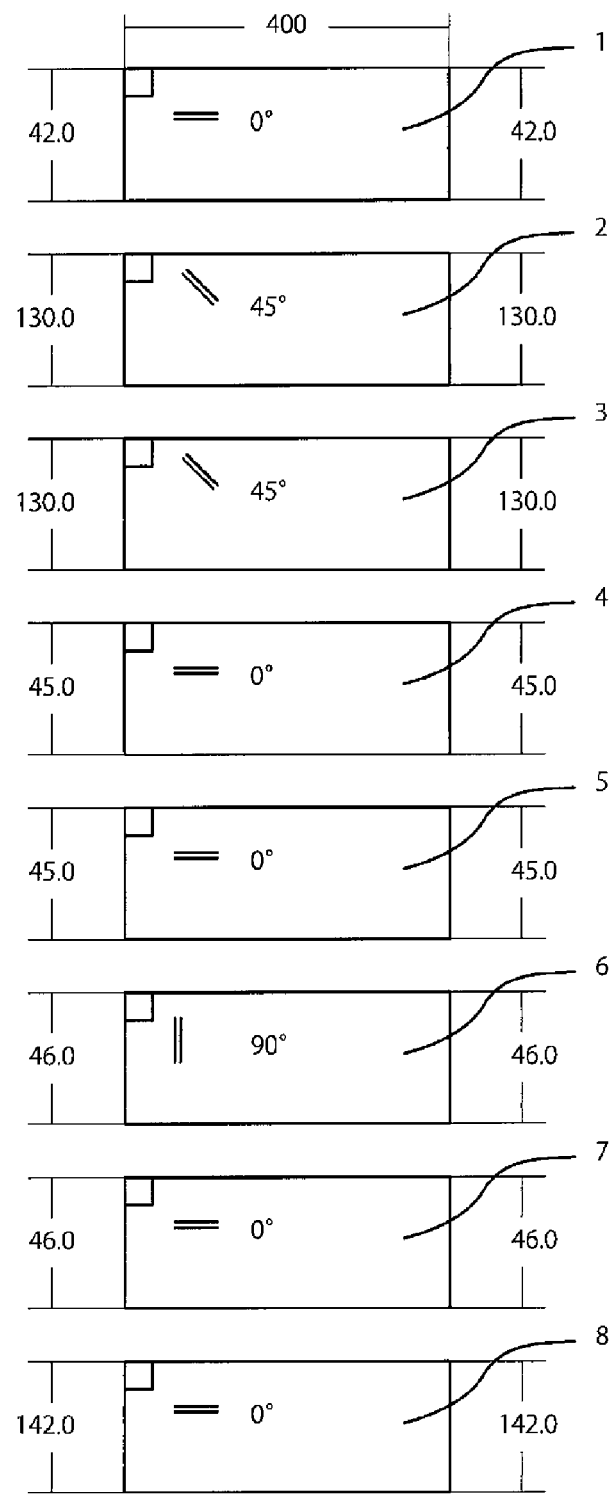
FIG. 4 shows an example of a laminated construction of fiber-reinforced prepregs constituting a tubular body made of a fiber-reinforced epoxy resin material.
Figure 5:
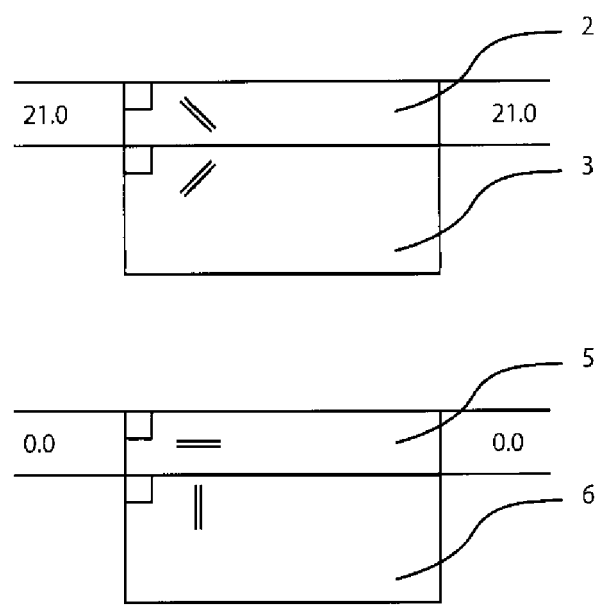
FIG. 5 illustrates an embodiment for laminating prepregs.

Tubular bodies made of a fiber-reinforced epoxy resin material were produced by a sheet winding method. Specifically, as shown in FIG. 4, prepregs 1 to 8 were wound around a core roller (mandrel) in order. The prepreg 1 forms an innermost layer, and the prepreg 8 forms an outermost layer. The prepregs 1, 4, 5, 7, and 8 are straight prepregs whose reinforcing fibers are arranged parallel to the axis of the tubular body. The prepregs 2 and 3 are bias prepregs whose reinforcing fibers are arranged so as to be tilted relative to the axis of the tubular body. The prepreg 6 is a hoop prepreg whose reinforcing fiber is arranged perpendicularly to the axis of the tubular body. As shown in FIG. 5, the prepreg 2 and the prepreg 3, and the prepreg 5 and the prepreg 6 were attached to each other such that the tilt directions of the reinforcing fibers thereof intersect each other. It is noted that as the prepreg 6, a commercially available prepreg (Torayca prepreg P805S-3 manufactured by Toray Industries Inc.) was used. A tape was wound around the outer peripheral surface of the obtained wound body and heated to cause a curing reaction. The winding conditions and the curing conditions are shown below. In FIGS. 4 and 5, the dimensions are indicated by the unit of mm.

Winding Conditions:
 Rolling speed: 34 Hz
 Tape: PT-30H manufactured by Shin-Etsu Chemical Co., Ltd., tension 6000±100 gf
 Pitch: 2.0 mm
 Main shaft rotational speed: 1870 to 1890 Hz Curing Conditions:
 (1) Elevating the temperature from normal temperature to 80° C. for 30 minutes;
 (2) Keeping at 80° C.±5° C. for 30 minutes±5 minutes;
 (3) Elevating the temperature from 80° C. to 130° C. for 30 minutes; and
 (4) Keeping at 130° C.±5° C. for 120 minutes±5 minutes.

Evaluation results with regard to the epoxy resin compositions and the fiber-reinforced epoxy resin materials are shown in Table 1.

TABLE 1

| | | | | Tubular body No. made of fiber-reinforced epoxy resin material | | | | |
|---|---|---|---|---|---|---|---|---|
| | | | | 1 | 2 | 3 | 4 | 5 |
| Epoxy resin composition | Formulation (parts by mass) | Epoxy resin components | Bisphenol A type epoxy resin (equivalent: 190 g/eq) | 40 | 40 | 40 | 40 | — |
| | | | Bisphenol F type epoxy resin (equivalent: 165 g/eq) | — | — | — | — | 40 |
| | | | Bisphenol F type epoxy resin (equivalent: 1070 g/eq) | 41 | 41 | 41 | 41 | 41 |
| | | | Phenolic novolac type epoxy resin (equivalent: 180 g/eq) | 15 | 14 | 7 | — | 7 |
| | | | Tetraglycidyl type epoxy resin (equivalent: 120 g/eq) | — | 1 | 8 | 15 | 8 |
| | | Thermoplastic resin | Polyvinyl formal | 4 | 4 | 4 | 4 | 4 |
| | | Curing agent | Dicyandiamide | 6.0 | 6.1 | 6.4 | 6.8 | 7.0 |
| | | Curing accelerator | Urea derivative | 3.0 | 3.0 | 3.2 | 3.4 | 3.5 |
| | Epoxy equivalent of entire epoxy resin components (g/eq) | | | 289.0 | 286.6 | 270.9 | 256.8 | 248.5 |
| | Content of novolac type epoxy resin (mass %) | | | 15.6 | 14.6 | 7.3 | 0 | 7.3 |
| | Content of tetraglycidyl type epoxy resin (mass %) | | | 0 | 1.0 | 8.3 | 15.6 | 8.3 |
| | Content of polyvinyl formal with respect to 100 parts by mass of epoxy resin components (parts by mass) | | | 4.2 | 4.2 | 4.2 | 4.2 | 4.2 |
| | Content of dicyandiamide (g/mol epoxy) | | | 18.1 | 18.2 | 18.1 | 18.2 | 18.1 |
| | Swelling ratio in MEK (mass %) | | | 21.6 | 22.3 | 24.8 | 26.7 | 24.5 |
| | Tensile strength (MPa) | | | 90.4 | 93.5 | 100.6 | 101.1 | 103.9 |
| | Elongation at break (%) | | | 11.6 | 12.4 | 15.0 | 15.6 | 13.8 |
| | Tensile elastic modulus (MPa) | | | 3215 | 3285 | 3349 | 3386 | 3205 |
| Reinforcing fiber | Type | | | Carbon | Carbon | Carbon | Carbon | Carbon |
| | Tensile elastic modulus (tf/mm²) | | | 30 | 30 | 30 | 30 | 30 |
| Fiber-reinforced epoxy resin material | Bending strength of test piece having 90 degree-fiber direction (MPa) | | | 102 | 110 | 121 | 135 | 120 |
| | Tubular body: three-point bending strength (N) | | | 1920 | 2060 | 2350 | 2620 | 2330 |

| | | | | Tubular body No. made of fiber-reinforced epoxy resin material | | | | |
|---|---|---|---|---|---|---|---|---|
| | | | | 6 | 7 | 8 | 9 | 10 |
| Epoxy resin composition | Formulation (parts by mass) | Epoxy resin components | Bisphenol A type epoxy resin (equivalent: 190 g/eq) | — | 40 | 40 | 40 | 40 |
| | | | Bisphenol F type epoxy resin (equivalent: 165 g/eq) | 40 | — | — | — | — |

TABLE 1-continued

|  |  |  | | | | | |
|---|---|---|---|---|---|---|---|
| | | Bisphenol F type epoxy resin (equivalent: 1070 g/eq) | 41 | 41 | 41 | 41 | 41 |
| | | Phenolic novolac type epoxy resin (equivalent: 180 g/eq) | — | — | — | 20 | — |
| | | Tetraglycidyl type epoxy resin (equivalent: 120 g/eq) | 15 | 20 | 30 | — | — |
| | Thermoplastic resin | Polyvinyl formal | 4 | 4 | 4 | 4 | 4 |
| | Curing agent | Dicyandiamide | 7.3 | 7.1 | 7.8 | 6.2 | 5.3 |
| | Curing accelerator | Urea derivative | 3.7 | 3.6 | 3.9 | 3.1 | 2.7 |
| | Epoxy equivalent of entire epoxy resin components (g/eq) | | 236.6 | 243.1 | 222.5 | 280.6 | 325.5 |
| | Content of novolac type epoxy resin (mass %) | | 0 | 0 | 0 | 19.8 | 0 |
| | Content of tetraglycidyl type epoxy resin (mass %) | | 15.6 | 19.8 | 27.0 | 0 | 0 |
| | Content of polyvinyl formal with respect to 100 parts by mass of epoxy resin components (parts by mass) | | 4.2 | 4.0 | 3.6 | 4.0 | 4.9 |
| | Content of dicyandiamide (g/mol epoxy) | | 18.0 | 17.1 | 15.6 | 17.2 | 21.3 |
| | Swelling ratio in MEK (mass %) | | 26.3 | 23.1 | 19.2 | 13.2 | 45.3 |
| | Tensile strength (MPa) | | 103.7 | 110.2 | 115.5 | 92.5 | 81.3 |
| | Elongation at break (%) | | 14.5 | 13.2 | 10.4 | 8.8 | 16.4 |
| | Tensile elastic modulus (MPa) | | 3487 | 3620 | 3815 | 3352 | 2823 |
| Reinforcing fiber | Type | | Carbon | Carbon | Carbon | Carbon | Carbon |
| | Tensile elastic modulus (tf/mm$^2$) | | 30 | 30 | 30 | 30 | 30 |
| Fiber-reinforced epoxy resin material | Bending strength of test piece having 90 degree-fiber direction (MPa) | | 133 | 130 | 100 | 96 | 93 |
| | Tubular body: three-point bending strength (N) | | 2600 | 2390 | 1950 | 1900 | 1820 |

The raw materials used in Table 1 are as follows.

Bisphenol A type epoxy resin (epoxy equivalent: 190 g/eq): jER 828EL (weight average molecular weight: 400, viscosity (25° C.): 12 Pa·s to 15 Pa·s) manufactured by Mitsubishi Chemical Corporation Bisphenol F type epoxy resin (epoxy equivalent: 165 g/eq): jER 807 (weight average molecular weight: 350, viscosity (25° C.): 3 Pa·s to 4.5 Pa·s) manufactured by Mitsubishi Chemical Corporation Bisphenol F type epoxy resin (epoxy equivalent: 1070 g/eq): jER 4005P (weight average molecular weight: 7200, solid at 25° C.) manufactured by Mitsubishi Chemical Corporation Phenolic novolac type epoxy resin (epoxy equivalent: 180 g/eq): jER 154 (number of epoxy groups per one molecule: three or more) manufactured by Mitsubishi Chemical Corporation Tetraglycidyl type epoxy resin (epoxy equivalent: 120 g/eq): jER 604 (N,N,N',N'-tetraglycidyldiam inodiphenylmethane) manufactured by Mitsubishi Chemical Corporation Polyvinyl formal: Vinylec (registered trademark) K manufactured by JNC Corporation Dicyandiamide: DICY7 manufactured by Mitsubishi Chemical Corporation Urea derivative: DCMU-99 (3-(3,4-dichlorophenyl)-1,1-dimethylurea) manufactured by Hodogaya Chemical Co., Ltd.

Carbon fiber: Torayca (registered trademark) T800SC (tensile modulus: 30 tf/mm$^2$ (294 GPa)) manufactured by Toray Industries Inc.

It is apparent from Table 1 that, the tubular body made of a fiber-reinforced epoxy resin material in which an epoxy resin composition constituting the fiber-reinforced epoxy resin material comprises, as an epoxy resin component, at least one selected from the group consisting of a bisphenol A type epoxy resin, a bisphenol F type epoxy resin and a novolac type epoxy resin, and a tetraglycidyl type epoxy resin, and a cured product of the epoxy resin composition has a swelling ratio in a range from 20 mass % to 44 mass % in methyl ethyl ketone, has high three-point bending strength and high bending strength for a test piece having a 90 degree-fiber direction. Accordingly, it is expected that the golf club shaft made of the tubular body has excellent strength.

REFERENCE SIGNS LIST 1 to 8: prepreg, 10: chuck, 12: test piece made of cured product of epoxy resin composition, 17: fiber-reinforced epoxy resin material, 18: tubular body, 20: fulcrum, 21: indenter, 22: midpoint between fulcrums

The invention claimed is:

1. A golf club shaft made of a fiber-reinforced epoxy resin material comprising a cured product of an epoxy resin composition and a reinforcing fiber,
    wherein the epoxy resin composition comprises, as epoxy resin components,
    a first epoxy resin component of at least one selected from the group consisting of a bisphenol A type epoxy resin, a bisphenol F type epoxy resin and a novolac type epoxy resin; and
    a second epoxy resin component of a tetraglycidyl type epoxy resin; and
    wherein the cured product of the epoxy resin composition has a swelling ratio in a range from 20 mass % to 44 mass % in methyl ethyl ketone, and
    the tetraglycidyl type epoxy resin content in the epoxy component ranges from 1 mass % to 19 mass %.

2. The golf club shaft according to claim 1, wherein the content of the tetraglycidyl type epoxy resin in the epoxy resin components ranges from 5 mass % to 19 mass %.

3. The golf club shaft according to claim 1, wherein the tetraglycidyl type epoxy resin is a glycidylamine type epoxy resin.

4. The golf club shaft according to claim 1, wherein the epoxy resin composition further comprises a polyvinyl formal in an amount ranging from 2 parts by mass to 12 parts by mass with respect to 100 parts by mass of the epoxy resin components.

5. The golf club shaft according to claim 1, wherein the epoxy resin composition comprises dicyandiamide as a curing agent and a urea derivative as a curing accelerator.

6. The golf club shaft according to claim 1, wherein the epoxy resin components have an epoxy equivalent in a range from 200 g/eq to 400 g/eq.

7. The golf club shaft according to claim 1, wherein the tetraglycidyl type epoxy resin includes at least one selected from the group consisting of tetraglycidyldiaminodiphenylmethane, tetraglycidyldiaminodiphenyl ether and tetraglycidyldiaminodiphenylsulfone.

8. The golf club shaft according to claim 1, wherein the reinforcing fiber includes a carbon fiber.

9. The golf club shaft according to claim 1, wherein the reinforcing fiber has a tensile elastic modulus in a range from 10 tf/mm$^2$ to 70 tf/mm$^2$.

10. The golf club shaft according to claim 1, wherein the swelling ratio of the cured product of the epoxy resin composition in methyl ethyl ketone is 25 mass % or more.

11. The golf club shaft according to claim 1, wherein the swelling ratio of the cured product of the epoxy resin composition in methyl ethyl ketone is 38 mass % or less.

12. The golf club shaft according to claim 1, wherein the epoxy resin composition comprises the bisphenol A type epoxy resin and the bisphenol F type epoxy resin as the first epoxy resin component.

13. The golf club shaft according to claim 12, wherein a mass ratio (bisphenol A type epoxy resin/bisphenol F type epoxy resin) of the bisphenol A type epoxy resin to the bisphenol F type epoxy resin in the epoxy resin composition ranges from 0.3 to 3.0.

14. The golf club shaft according to claim 12, wherein the epoxy resin composition further comprises the novolac type epoxy resin as the first epoxy resin component.

15. The golf club shaft according to claim 14, wherein the bisphenol A type epoxy resin and the bisphenol F type epoxy resin are included in a difunctional epoxy resin, and the difunctional epoxy resin content in the entire epoxy resin components ranges from 75 mass % to 98 mass %.

16. The golf club shaft according to claim 1, wherein the epoxy resin composition comprises the novolac type epoxy resin as the first epoxy resin component.

17. The golf club shaft according to claim 16, wherein the novolac type epoxy resin content in the entire epoxy resin components ranges from 2 mass % to 19 mass %.

18. The golf club shaft according to claim 16, wherein the tetraglycidyl type epoxy resin and the novolac type epoxy resin total content in the entire epoxy resin components ranges from 4 mass % to 25 mass %.

19. A golf club shaft made of a fiber-reinforced epoxy resin material comprising a cured product of an epoxy resin composition and a reinforcing fiber,
wherein the epoxy resin composition comprises, as an epoxy resin component,
a bisphenol A type epoxy resin;
a bisphenol F type epoxy resin;
a novolac type epoxy resin; and
a tetraglycidyl type epoxy resin; and
wherein the cured product of the epoxy resin composition has a swelling ratio in a range from 20 mass % to 44 mass % in methyl ethyl ketone.

20. A golf club shaft made of a fiber-reinforced epoxy resin material comprising a cured product of an epoxy resin composition and a reinforcing fiber,
wherein the epoxy resin composition comprises, as an epoxy resin component,
a novolac type epoxy resin; and
a tetraglycidyl type epoxy resin; and
wherein the cured product of the epoxy resin composition has a swelling ratio in a range from 20 mass % to 44 mass % in methyl ethyl ketone, and
the tetraglycidyl type epoxy resin and the novolac type epoxy resin total content in the entire epoxy resin components ranges from 4 mass % to 25 mass %.

* * * * *